US006263733B1

United States Patent
Reimer et al.

(10) Patent No.: US 6,263,733 B1
(45) Date of Patent: Jul. 24, 2001

(54) SENSOR FOR DETECTION OF ACCELERATION AND ATTITUDE WITHIN A VEHICLE

(75) Inventors: Ernest M. Reimer, Oster Cove; Lorna H. Baldwin, St. John's, both of (CA)

(73) Assignee: Canpolar East Inc., St. John's (CA)

( * ) Notice: Subject to any disclaimer, the term of this patent is extended or adjusted under 35 U.S.C. 154(b) by 0 days.

(21) Appl. No.: 09/449,769

(22) Filed: Nov. 26, 1999

(30) Foreign Application Priority Data

Nov. 26, 1998 (CA) ................................................ 2254535

(51) Int. Cl.⁷ ...................................................... G01P 15/08
(52) U.S. Cl. .......................................................... 73/514.26
(58) Field of Search ..................... 73/514.26; 250/227.14, 250/231.1

(56) References Cited

U.S. PATENT DOCUMENTS

| | | |
|---|---|---|
| 3,587,011 | 6/1971 | Kurz . |
| 3,808,697 | 5/1974 | Hall . |
| 4,344,235 | 8/1982 | Flanders . |
| 4,430,895 | 2/1984 | Colton . |
| 4,627,172 | 12/1986 | Afromowitz . |
| 4,837,537 | 6/1989 | Nakada et al. . |
| 4,912,662 | 3/1990 | Butler et al. . |
| 4,967,597 | 11/1990 | Yamada et al. . |
| 5,008,774 | 4/1991 | Bullis et al. . |
| 5,350,189 | 9/1994 | Tsuchitani et al. . |
| 5,351,542 | 10/1994 | Ichimura et al. . |
| 5,356,671 | 10/1994 | Drs . |
| 5,373,124 | 12/1994 | Abendroth et al. . |
| 5,388,460 | 2/1995 | Sakurai et al. . |
| 5,412,986 | 5/1995 | Beringhause et al. . |
| 5,436,838 | 7/1995 | Miyamori . |
| 5,452,519 | 9/1995 | Crocker et al. . |
| 5,535,626 | 7/1996 | Bullis et al. . |
| 5,571,972 | 11/1996 | Okada . |
| 5,594,400 | 1/1997 | King . |
| 5,623,099 | 4/1997 | Schuster et al. . |
| 5,656,846 | 8/1997 | Yamada . |
| 5,676,851 | 10/1997 | Suzuki et al. . |
| 5,719,333 | 2/1998 | Hosoi et al. . |
| 5,748,547 | 5/1998 | Mori et al. . |
| 5,917,180 | * 6/1999 | Reimer et al. .................. 250/227.14 |

* cited by examiner

Primary Examiner—Richard A. Moller
(74) Attorney, Agent, or Firm—McFadden, Fincham

(57) ABSTRACT

A vehicle acceleration and attitude sensor is provided, having use as a vehicle collision sensor for activation of air bags and the like, and as well for detecting an unsafe angle or attitude of the vehicle. A compressible carrier medium of light or other wave energy, such as translucent foam, is coupled with a light or other wave energy source and a receiver. An inertial mass, which may consist of the carrier medium itself, is in contact with the carrier medium and operates to compress the carrier medium when the apparatus is either accelerated or tilted beyond a predetermined amount. A signal coupler and processor are associated with the energy source and receiver. The apparatus operates on the principle whereby compression of a scattering medium or an integrating cavity, within the region surrounding a light or other wave energy source, will increase the intensity of the wave energy. This increased intensity is translated into a measurement of the acceleration or tilt experienced by the sensor.

22 Claims, 4 Drawing Sheets

SENSOR FOR DETECTION OF ACCELERATION AND ATTITUDE WITHIN A VEHICLE

FIELD OF INVENTION

The present invention relates to safety and control of vehicles, and in particular sensors for determining the attitude and acceleration of a vehicle. The present invention may be adapted as well for use in other moving craft, including air, water, and space craft. Such sensors may be used in association with air bags and other vehicle safety systems, to control deployment of same. As well, such sensors may be used to measure the tilt of a vehicle, for example to trigger a warning signal to operators of off-road or construction vehicles.

BACKGROUND OF THE INVENTION

Vehicle safety systems, including air bags and seat belt tighteners are conventionally triggered by various detection means and sensors, including acceleration detectors, that detect rapid decelerations and accelerations indicative of vehicle collision or impact. Further, attitude sensors to detect the angle of inclination of a vehicle serve an important safety function, including for example within all terrain, off-road or construction vehicles.

The term "vehicle" herein refers to all manner of craft for use on land or in air, water or space.

Conventionally, accelerometers comprise a frame, a mass, a spring-like supporting system for suspending the mass within the frame for relative movement within the frame, and damping means. Conventionally, an electronic circuit translates mechanical movement of the mass into an electrical signal. Most acceleration sensors operate mechanically with a displacement or vibration of a moveable arm detecting acceleration. These sensors measure displacement of an object from a specific reference point to obtain an acceleration value. Common acceleration sensors used in automotive safety restraint systems include capacitive, piezoresistive and piezoelectric sensors. A further type of system is the "reed switch", as disclosed within U.S. Pat. Nos. 3,587,011 and 5,594,400. In this arrangement, a pair of magnets are arranged in inverted polar orientations, producing opposed magnetic fields. A displacement of the reed switch results in a change of magnetic field, triggering the safety device.

Existing acceleration sensors suffer several drawbacks when implemented in connection with a vehicle safety system. In particular, many existing devices when conventionally manufactured have been found to have limited sensitivity to a crash event and suffer from an inability to be "fine tuned" to a particular acceleration level. While the sensitivity may be increased to a suitable level, this typically entails unacceptably high manufacturing costs. In the result, safety systems such as air bags are prone to deployment either too easily or the opposite.

In addition to acceleration sensors, other sensors exist which determine a vehicle's attitude. These sensors, which are well established within the aerospace industry, may be used to determine a vehicle's inclination for safety reasons. Conventional attitude sensors include a spherical ball suspended in an inert fluid, out of contact with a housing which encloses the assembly. The ball may include a magnet, whose orientation is affected by the earth's magnetic field. Monitoring the orientation of this magnet, which may be accomplished by the use of a pair of hall effect sensors positioned opposite to one another within the housing, permits an inclination reading. For example, see U.S. Pat. Nos. 5,452,519 and 5,356,671. A further prior art example is the linear servo accelerometer, which consists of a pair of accelerometers mounted on a horizontal plane at right angles to another. Any movement of the accelerometer from the normal horizontal plane is detected as movement along the vertical axis. See for example U.S. Pat. No. 3,808,697.

It is desirable to provide an improved acceleration and attitude sensor, providing within a single, relatively inexpensive unit an accurate and reliable detector of both acceleration and attitude. Such an apparatus may have applications for the triggering of safety devices in vehicles, and as well other useful applications within vehicles and other craft operating on land, water, air and space. Superior acceleration and attitude detection may be achieved through the use of a sensor which operates according to principles of detection of compression of a medium within which light or other wave energy is scattered, rather than strictly electrical or mechanical means.

Within applicant's previous PCT International application no. PCTCA98/00686 there is disclosed a pressure sensor which operates according to the principle whereby the intensity of light or other wave energy which is dispersed and scattered within an integrating cavity, is increased as the region within which the energy is dispersed is diminished. For example, as the medium is compressed, the scattering region is diminished, resulting in a detectable increase in the integrated or scattered light intensity. According to this principle, a pressure sensor may comprise a compressible carrier medium for light or other wave energy, containing scattering centers for disbursing the light within the carrier medium. Wave energy transmission and receiving means are associated with the carrier medium to transmit and receive, respectively, the wave energy to and from the carrier medium.

The term "light" will be generally used herein in reference to wave energy of any suitable type. It will be understood that other forms of wave energy including electromagnetic radiation in the non-visible spectra and sound may comprise the wave energy for use in the present invention.

The carrier medium may be enclosed within a compressible housing such as a flexible envelope or the like. Pressure applied to the housing compresses the carrier medium, thereby increasing the intensity of the light within the region surrounding the light source, in proportion to the decrease in volume. The change in light intensity is detected by the receiver, which transmits the information to a signal processing means. The carrier medium preferably includes multiple light scattering centers evenly disbursed throughout the medium. A suitable medium may be provided by a translucent foam material. Alternatively, the interior face of the enclosure may provide the light dispersion function. The enclosure comprises an integrating optical cavity, which is defined as a region or volume either bounded by an enclosure and comprising a deformable material with the characteristic whereby illumination within the cavity undergoes multiple scattering reflections or refractions to thereby become effectively randomized and smoothed out in its distribution throughout the cavity. In such a cavity, at the limit, information about the original direction of illumination is eventually lost and the light becomes fully scattered. An integrating optical cavity may be an air or gas filled enclosure, or may be a volume within by a translucent solid such as an open-cell or closed cell foam matrix that provides optical scattering sensors.

It is a characteristic of such a cavity that, for a light source with a constant power output, the light intensity within the cavity is a function of the volume of the cavity, the position of the light source and the reflectance of the walls of the envelope. The cavity may be formed with virtually any shape, although certain extreme shapes may not respond ideally.

A pressure sensor of this type may take several convenient forms that are adapted for the purposes of the present invention. For example, the sensor may comprise an elongate, flattened member featuring multiple light sources and receivers. Alternatively, the scattering medium may comprise a block of foam shaped to fit within a defined cavity or receiving space.

SUMMARY OF THE INVENTION

It is an object of the invention to provide a sensing or detection means which may be mounted within a vehicle for detection of acceleration and/or attitude of the vehicle. It is a further object to provide an improved acceleration and/or attitude sensor, and to provide such a sensor as a component of a vehicle.

The invention comprises in one aspect, a compressible carrier medium of wave energy, preferably comprising a block of translucent material, the carrier medium having wave energy scattering centers dispersed within it to create a volume containing scattered wave energy upon the application of wave energy to the medium;

- a wave energy source coupled to and in substantial contact with the carrier medium;
- a wave energy receiver responding to the integrated intensity of scattered wave energy within the carrier medium;
- an inertial mass in contact with the carrier medium;
- a support for supporting the carrier medium, inertial mass, energy source and energy receiver; and
- signal coupling means connected to the receiver for transferring signal therefrom to a signal processing means, wherein the region around the wave energy source and the receiver substantially defines these scattered energy volume. The inertial mass contains sufficient mass, and is mounted in an appropriate position, whereby a predetermined amount of acceleration experienced by the device in a predetermined direction causes the inertial mass to compress the carrier medium to increase the integrated intensity of scattered wave energy sufficiently to trigger a response within the signal processing means.

Preferably, the wave energy comprises light. The light source may comprise an LED in contact with the carrier medium, or alternatively a fiber optic cable, a transmitting end of which is in contact with the carrier medium and the receiving end of which communicates with a remote light source. In one aspect, the resiliency of the scattering medium, in combination with the size, shape and mass of the inertial mass, permits discriminatory detection of acceleration within the order of approximately 50 g's, and having a duration in the order of approximately 1 millisecond.

In a further aspect, the inertial mass is retained between two separate volumes of the carrier medium. Conveniently, a housing surrounds the carrier medium, and the inertial mass is retained in position by means of roller bearings or other slidable low friction contacts between the housing and inertial mass. Within this arrangement, preferably each block of carrier medium is associated with a respective energy source and receiver. This arrangement is suitable for bidirectional acceleration detection along a single axis.

In a further aspect, the energy source and receiver comprise a light emitting diode and photo detector, respectively, the same both mounted to a silicon chip substrate, which also supports a single unitary volume of the carrier medium. An inertial mass is conveniently mounted to the carrier medium at a position opposing the substrate. Within this aspect, a supporting frame and suitable electrical contacts are conveniently provided. In this configuration, single axis, unidirectional acceleration may be detected. Alternatively, the separate inertial mass may be dispensed with, and the function of this element is provided by the mass of the carrier medium itself. This arrangement is suitable for detection of relatively high impacts.

In a further aspect, a two axis multidirectional inertial sensor comprises an inertial mass fully surrounded within one plane by a carrier medium, with at least three and preferably four or more generally co-planar energy emitters and detectors in contact with the carrier medium. Conveniently, the inertial mass may comprise a central disk shaped or spherical member, with the surrounding carrier medium comprising an annular disk or hollow sphere which surrounds and contacts the central mass. This version may also form a three axis multidirectional sensor by providing a mass fully surrounded in all directions by the carrier medium. Wave energy transmitters and receivers are mounted in multiple non co-planar positions around the exterior of the carrier medium, or implanted within the carrier medium and evenly spaced around the central mass.

In a further aspect, the foam density and inertial mass are selected to achieve a mechanical resonance frequency higher or lower than the frequency of the acceleration events to be resolved. In one version, the density and mass are selected to provide a mechanical resonance frequency above 1 kilohertz, for detection of automotive crash accelerations in the order of 50 g's and a duration of approximately 1 millisecond. In a further aspect, for the detection of impact events of between approximately 10 and 50 g's, with a duration of approximately 10 milliseconds, the carrier medium resiliency and inertial mass are selected to provide resonance frequency in the order of 1 hertz.

DETAILED DESCRIPTION OF THE PREFERRED EMBODIMENTS

Figure 1:
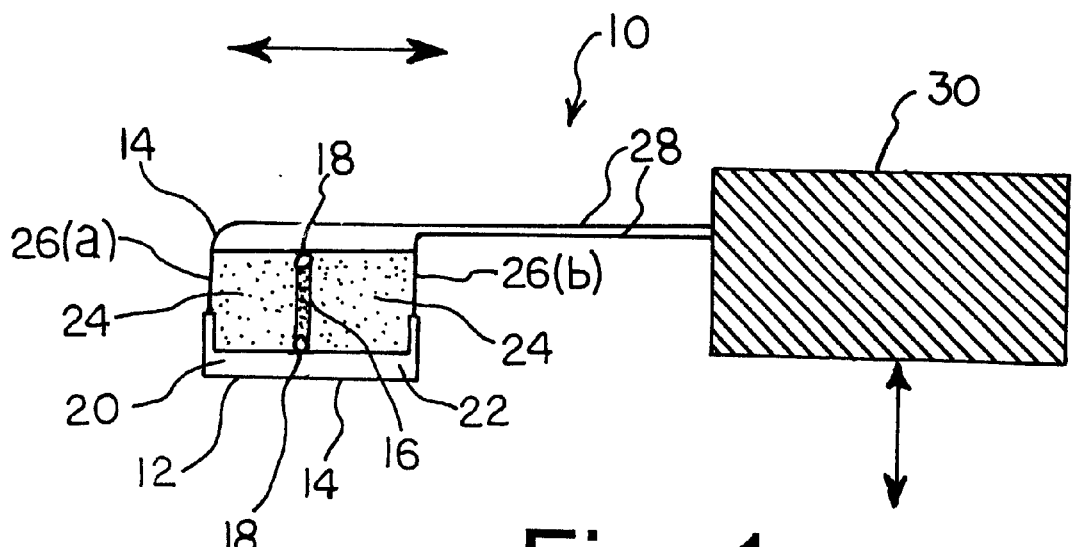
FIG. 1 is a schematic view of a single axis bidirectional accelerometer according to the present invention.

Turning to FIG. 1, a first version of the device 10 detects acceleration along a single axis, within two directions (as indicated by the arrow), and is specifically adapted for detection of relatively high acceleration, brief duration events. Within this version, the device 10 comprises a housing 12 featuring upper and lower parallel generally planar retainers 14. An inertial mass is positioned vertically within the housing, and conveniently comprises a metal plate 16. The plate is mounted for longitudinal movement in the direction of acceleration detection, namely axially along the longitudinal axis of the housing, in the forward or rearward direction. Bearings 18 or the like slidably engage the plate 16 within the interior of the housing 12, to facilitate gliding of the plate within the housing. The plate 16 is retained in a vertical position, substantially transversely spanning the housing. The plate thus separates the housing into forward and rear compartments 20 and 22, aligned in the direction of impact detection. A block of translucent foam 24 or other suitable carrier medium is disposed within each compartment, in contact with the transverse plate and the lower retainer 14 comprises a support for the foam block 24.

Two light emitter detector units 26(a) and (b) are mounted within the housing, at respective ends of the housing and in contact with the foam blocks 24. The foam blocks are each thus sandwiched between a corresponding emitter/detector unit and the transverse plate. The emitter/detector units may comprise a pair of fiber optic fibers bundled together to form a cable, whereby a first of the fibers comprises an emitter and the second comprises a detector. Alternatively, the unit may comprise an LED and a photo receptor in direct contact with the carrier medium.

The emitter/detector units are each connected by cable 28 to a control and processor unit 30. In the case of a fiber optic light emitter the processor further includes a light source such as an LED in communication with the corresponding light emitter fiber and a photo receptor in communication with the receptor fiber. The structure and functions of the control unit are essentially the same within all embodiments of the invention, and will be described in detail below.

The control unit 30 is connected to a power source, not shown, and is further connected to a safety system which responds to a vehicle impact, such as an air bag, seat belt tightener or the like (not shown).

Figure 2:
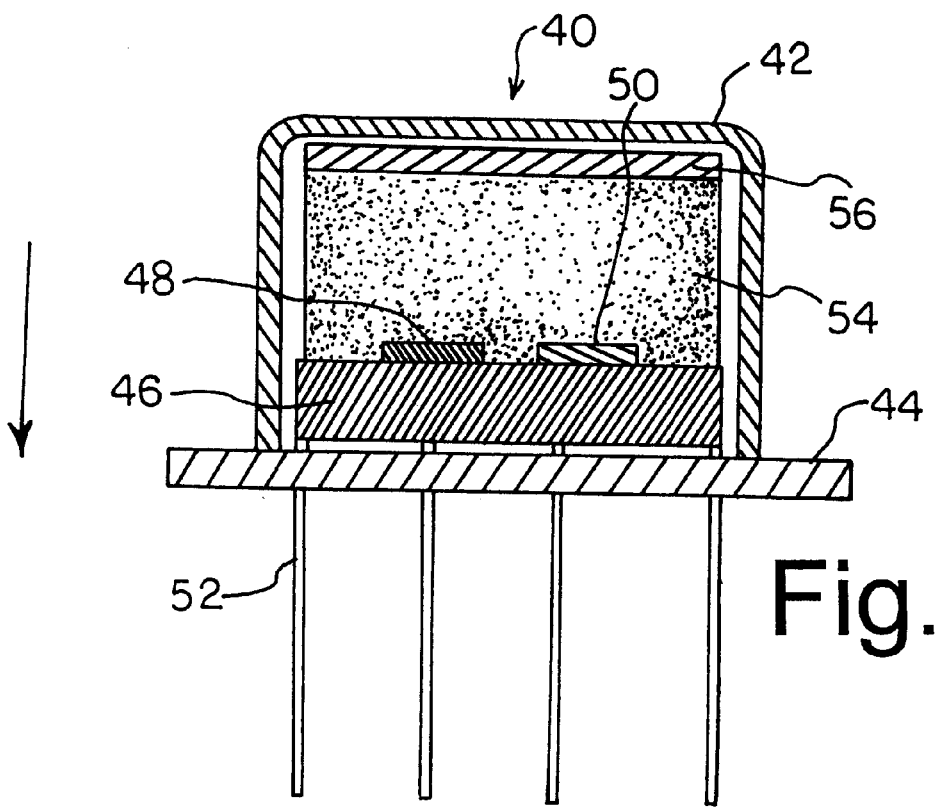
FIG. 2 is a schematic view of a single axis unidirectional accelerometer.

A further version is illustrated within FIG. 2, and comprises a relatively compact single axis unidirectional accelerometer 40. The device includes a rigid housing 42, mounted to a flat base 44. A planar silicon chip substrate 46 is mounted within the compartment, conveniently on or adjacent the base. The substrate supports a light emitting diode 48 on the upper surface thereof, and a photo detector 50 adjacent thereto. Electrical leads 52 extending through the base provide power to the substrate, and transmit electrical signals therefrom. The substrate comprises a conventional LED and photo detector circuit.

A block of translucent foam 54 or other like carrier medium overlies the substrate and the LED and photo detector. An inertial mass, comprising a metal plate 56 or the like, caps the block of carrier medium. Within this version, force in the direction indicated by the arrow, i.e. acceleration of the detector in the direction opposite the arrow, compresses the carrier medium between the inertial mass and substrate, thereby increasing the intensity of the illumination in the region surrounding the light source and reducing the intensity of illumination at some remove from the source the flat base 44 comprises a support for the substrate 46, foam block 54, doide 48, and detector 50.

Figure 3:
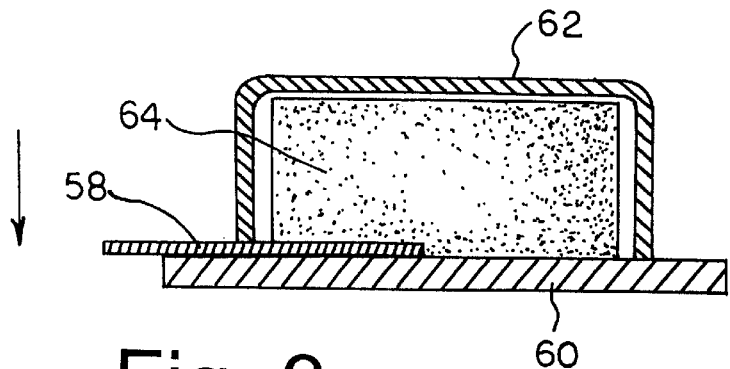
FIG. 3 is a schematic view of a further embodiment as in FIG. 2.

FIG. 3 illustrates a variation of the embodiment shown in FIG. 2. In this version, the light source and detector comprise unitary fiber optic emitters and detectors 58. This version thus comprises a base 60 and housing 62, with the carrier medium 64 and emitter/detector 58 unit being supported by or fastened to the base. Within this version, the inertial mass comprises simply the mass of the carrier medium, which in the event of a sufficient amount of acceleration will compress, resulting in increased light intensity in the region surrounding the light emitter/detector. This arrangement is suitable for detection of very high g forces.

Figure 4:
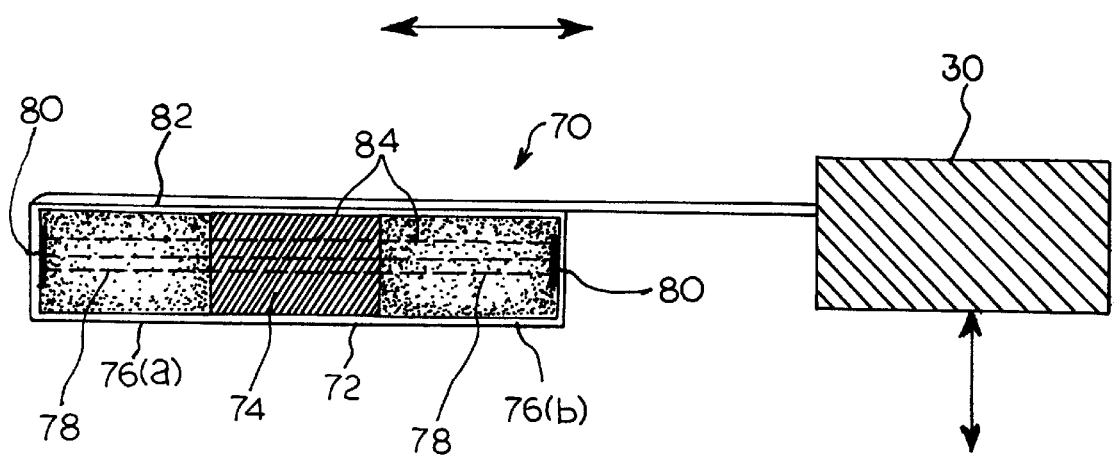
FIG. 4 is a schematic view of a further embodiment of a single axis sensor.

FIG. 4 illustrates a single axis, bidirectional detector 70, similar to the version shown in FIG. 1, but specifically adapted for the detection of relatively low acceleration, long duration events. In this version, an elongate housing 72 contains a centrally disposed inertial mass 74 which divides the housing into front and rear compartments 76(a) and (b) aligned along the direction of acceleration detection. The front and rear compartments each house a block of relatively soft carrier medium 78. The inertial mass in turn is relatively large and has a relatively high mass in comparison with the high acceleration, low duration detector exemplified in FIG. 1. Two emitter/detector units 80 are positioned on respective ends of the housing, opposing the central inertial mass, and are connected to a control unit as described above.

The assembly is fitted with a low friction bearing surface 82 within the interior of the housing, which allows relatively free travel of the inertial mass. In order to increase the device sensitivity, fluid-filled channels 84 extend longitudinally through the carrier medium and inertial mass. The foam carrier medium 74 has an elastic constant that is just large enough to hold the inertial mass in place in a zero g or sub g threshold acceleration situation. This design makes use of elastic foam or lattice structures as the carrier medium which show a high stiffness at a zero deformation but once deformed, have a much lower stiffness. In this assembly the inertial mass encounters low resistance to displacement once the acceleration exceeds a specified intensity threshold. The resonant frequency of the assembly is relatively low. Of particular interest to vehicle applications is detection of events having an acceleration of 10 to 50 g's, with a duration in the order of 10 milliseconds. Resonance in the order of 1 hertz within the device will ensure that these events are resolved. In order to achieve this level of sensitivity, the sensor must be relatively long in the direction of acceleration detection. Since a 50 g, 30 millisecond event, will displace the seismic mass by about 20 millimeters, the overall length of the device may be in the order of 100 millimeters.

It will be seen that any of the above single axis sensor will in fact detect acceleration along any axis which is offset from the main axis, with the efficiency of detection declining to zero as the angle increases. Thus, any of these arrangements can be used whereby detection is required within a relatively narrow range centered on a single axis.

Figure 5:
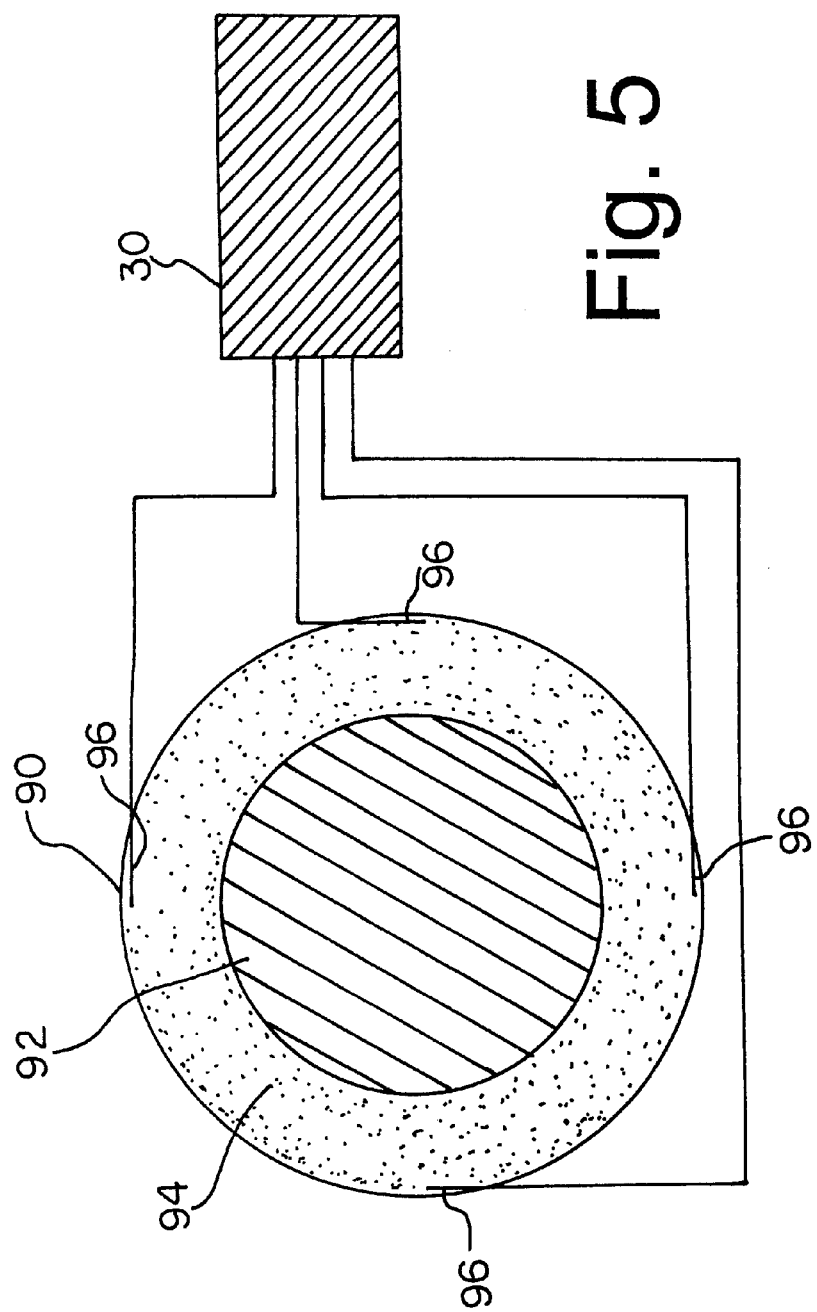
FIG. 5 is a schematic view of a two axis multidirectional sensor.

A two axis multidirectional sensor is illustrated within FIG. 5. In this version a cylindrical housing 90 contains a centrally disposed disk-shaped inertial mass, comprising a metal disk 92. An annular space is defined between the central inertial mass and the interior of the housing 90, with this space being substantially filled by a foam carrier medium 94. At least three and preferably four emitter/detector units 96 are positioned around the perimeter of the carrier medium and in communication therewith. The emitter/detector units are linked to a processing unit 30 as described below. Within this version, acceleration along the two axes shown by arrows within FIG. 5 as well as any intermediate direction, may be detected.

A further variant of the embodiment shown in FIG. 5 comprises a three axis, multidirectional sensor 100. In this version, illustrated in FIG. 6, the housing 102, carrier medium 104 and central inertial mass 106 comprise concentric spherical members. Multiple emitter/detector units 108 are evenly positioned about the periphery of the carrier medium, in much the same manner as described above. The central mass may comprise a solid metal sphere, or a liquid body retained within a leakproof central cavity within the carrier medium 104.

Figure 6:
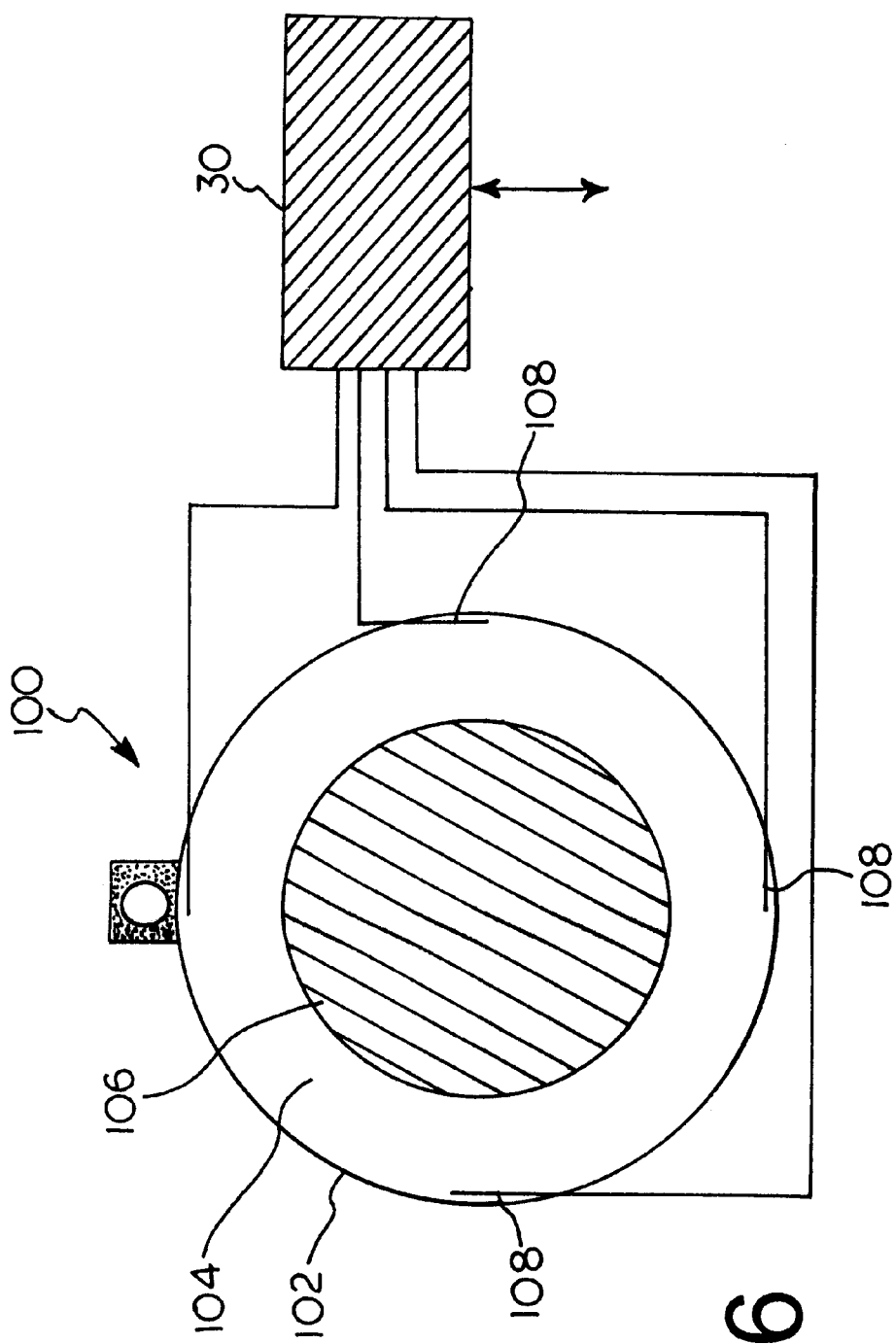
FIG. 6 is a schematic view of a three axis multidirectional sensor.

The three axis sensor is capable of resolving roll, pitch and yaw in any direction, as indicated by the arrows in FIG. 6. The inertial mass 106 may comprise a liquid having a viscosity selected to damp modal vibration of the assembly. The resonance frequency of the assembly will typically be higher then the time scale of events of interest.

The embodiments illustrated in FIGS. 5 and 6 are intended specifically to comprise rate or attitude sensor configurations. Rate sensors detect rate of turn by detecting rotational accelerations or centrifugal accelerations. Attitude or inclination sensors operate by detecting off-axis gravitational accelerations. For automotive applications, these sensors are tuned for optimal operation at accelerations in the order of +/−1 g.

Although the present invention has been described by way of a preferred embodiment thereof, it will be seen by those skilled in the art to which this invention relates, that departures from these described embodiments may be made while still remaining within the scope of the invention as defined by the claims of this patent specification.

We claim:

1. An acceleration sensor comprising:
   a volume of compressible material, said material permitting the passage of light generally freely therethrough while substantially fully scattering light transmitted within said material;
   a source of wave energy comprising light in operative communication with said volume of compressible material for transmitting light into said volume to form a region therein of substantially scattered wave energy;
   support means for supporting said compressible material;
   passive compression means for compressing said compressible material against said support means in response to acceleration of said sensor for causing an increase in in intensity of said wave energy within said region;
   a receiver for detecting the intensity of light within said region of scattered wave energy;
   signal processing means in operative communication with said receiver for detecting the intensity of wave energy within said region of compressible material and providing a selected output in response to acceleration detected by said sensor.

2. A sensor as defined in claim 1, wherein said compression means comprises said compressible material per se compressing in response to acceleration.

3. An acceleration sensor as defined in claim 1 wherein said wave energy comprises light.

4. An acceleration sensor as defined in claim 3, wherein said source of wave energy comprises a fiber optic line in communication with a light source, and said receiver comprises a fiber optic line in communication with a photo detector.

5. An acceleration sensor as defined in claim 1, where said compressible material comprises light-translucent foam.

6. An acceleration sensor as defined in claim 1, further comprising a housing, said compressible material, compression means, source of wave energy and receiver being retained within said housing.

7. A sensor as defined in claim 1, wherein said compression means comprises a member in contact with said compressible material.

8. An acceleration sensor as defined in claim 7 comprising an attitude sensor, wherein said member is substantially fully surrounded by said carrier medium, and wherein said source of wave energy and said receiver comprises multiple wave energy sources and receivers disposed about 3 axes surrounding said member for detection of increase wave energy intensity indicative of movement of said member relative to said carrier medium, in any direction.

9. An acceleration sensor as defined in claim 7 for acceleration detection along one axis in two directions, wherein said compressible material comprises first and second volumes, said member being positioned between said first and second volumes, and further comprising first and second sources and first and second receivers each coupled with a corresponding of said volumes, wherein said member is mounted for compression of one of said volumes when subjected to acceleration in a direction that falls on a plane connecting said first and second volumes, to compress one of said volumes for detection of acceleration of said sensor along one axis.

10. An acceleration sensor as defined in claim 9, wherein there is further provided first and second retainer members on opposing sides of said compressible material, said member comprising a plate substantially spanning said upper and lower retainer members for sliding engagement therewith.

11. An acceleration sensor as defined in claim 10, wherein bearing means associated with said plate provide sliding engagement between said plate and said retainer members.

12. An acceleration sensor as defined in claim 9, wherein fluid-filled channels extend through said first and second volumes of said compressible material and said member.

13. An acceleration sensor as defined in claim 12, for the detection of acceleration events having an acceleration of between 10 and 50 g's, with a duration of at least 10 milliseconds.

14. An acceleration sensor as defined in claim 7 for acceleration detection along one axis in solely a single direction, wherein said compressible material comprises a single volume bounded along one face by said member, the opposed face of said compressible material being in operative communication with said source and receiver.

15. An acceleration sensor as defined in claim 14, wherein said compressible material is bounded along one face by a substrate, said substrate being coupled to said source and receiver, and being further coupled to said signal coupling means.

16. An acceleration sensor as defined in claim 14, wherein said substrate comprises a printed circuit and said wave energy source comprises an LED coupled to said substrate.

17. An acceleration sensor as defined in claim 7 wherein said compressible material is generally cylindrical with a central annular opening, said perimeter being generally disc shaped and substantially filling said annular opening, and wherein at least three wave energy sources and receivers are provided, said wave energy sources and receivers being generally evenly distributed around the member of said compressible material.

18. An acceleration sensor as defined in claim 17, wherein said member comprises a fluid.

19. A sensor as defined in claim 17, wherein said member comprises a solid.

20. An acceleration sensor as defined in claim 7, wherein said compressible material forms a hollow sphere, said member substantially filling the hollow center of said sphere, there being further provided multiple wave energy sources and receivers generally evenly disbursed around the periphery of said carrier medium to detect acceleration or movement in any direction.

21. An acceleration sensor as defined in claim 20, wherein said member comprises a liquid.

22. An acceleration sensor as defined in claim 20, wherein said member comprises a solid.

* * * * *